US006403528B1

(12) United States Patent
Shackle et al.

(10) Patent No.: US 6,403,528 B1
(45) Date of Patent: Jun. 11, 2002

(54) DEVELOPER FOR USE WITH CARBONLESS COPY PAPER AND PHOTO IMAGING SYSTEM

(75) Inventors: Dale R. Shackle, Morgan Hill; Benjamin Chaloner-Gill, San Jose, both of CA (US)

(73) Assignee: Rentech, Inc., San Jose, CA (US)

( * ) Notice: Subject to any disclaimer, the term of this patent is extended or adjusted under 35 U.S.C. 154(b) by 0 days.

(21) Appl. No.: 09/757,464

(22) Filed: Jan. 10, 2001

Related U.S. Application Data

(63) Continuation of application No. 09/290,538, filed on Apr. 12, 1999, now Pat. No. 6,242,167.

(51) Int. Cl.$^7$ .............................................. B41M 5/132
(52) U.S. Cl. ........................ 503/201; 503/210; 503/211; 503/212; 503/225
(58) Field of Search .......................... 503/201, 210–212, 503/216, 225; 430/465, 464, 467, 477, 479

(56) References Cited

U.S. PATENT DOCUMENTS

| | | | | |
|---|---|---|---|---|
| 2,712,507 A | 7/1955 | Green | .......................... | 117/36 |
| 2,730,456 A | 1/1956 | Green et al. | .................. | 117/36 |
| 2,730,457 A | 1/1956 | Green et al. | .................. | 117/36 |
| 3,244,549 A | 4/1966 | Farnham et al. | ........... | 117/36.2 |
| 3,244,550 A | 4/1966 | Farnham et al. | ........... | 117/36.2 |
| 3,418,250 A | 12/1968 | Vassiliades | ................. | 252/316 |
| 3,432,327 A | 3/1969 | Kan et al. | .................. | 117/36.2 |
| 3,737,410 A | 6/1973 | Mueller | ....................... | 260/59 |
| 3,772,052 A | 11/1973 | Kimura et al. | ............. | 117/36.2 |
| 3,981,821 A | 9/1976 | Kiritani et al. | ............. | 252/316 |
| 3,993,831 A | 11/1976 | Vassiliades | .................. | 428/307 |
| 3,996,156 A | 12/1976 | Matsukawa et al. | ......... | 252/316 |
| 3,996,405 A | 12/1976 | Porter, Jr. | .................... | 428/307 |
| 4,000,087 A | 12/1976 | Maalouf | ...................... | 252/316 |
| 4,115,327 A | 9/1978 | Kikuga et al. | ............. | 260/17.2 |
| 4,399,209 A | 8/1983 | Sanders et al. | ............. | 430/138 |
| 4,520,222 A | 5/1985 | Reusser et al. | | |
| 4,688,060 A | 8/1987 | Tanaka et al. | ............... | 503/214 |
| 4,853,364 A | 8/1989 | Liang et al. | ................. | 503/216 |
| 4,859,561 A | 8/1989 | Metz et al. | .................. | 430/138 |
| 4,869,805 A | 9/1989 | Lok et al. | .................... | 208/111 |
| 5,030,539 A | 7/1991 | Kintz et al. | ................. | 430/138 |
| 5,225,117 A | 7/1993 | Wason et al. | ............... | 423/339 |
| 5,262,144 A | 11/1993 | McCulloch | ............... | 423/328.2 |
| 5,273,736 A | 12/1993 | Nakagawa | ................. | 423/702 |
| 5,281,407 A | 1/1994 | Nakagawa | | |
| 5,401,708 A | 3/1995 | Shimizu et al. | ............. | 503/226 |
| 5,508,708 A | 4/1996 | Ghosh et al. | ............... | 342/457 |

OTHER PUBLICATIONS

Shannon, M.D., et al., "Structure of the two-dimensional medium-pore high-silica zeolite NU-87," *Nature*, vol. 353, Oct. 3, 1991.

Valyocsik, Ernest W. and Rollmann, Louis D., "Diamines as templates in zeolite crystallization," *Zeolites*, vol. 5, Mar. 1985.

Zones, S.I., "Synthesis of pentasil zeolites from sodium silicate solutions in the presence of quaternary imidazole compounds," *Zeolites*, vol. 9, Nov. 1989.

*Primary Examiner*—Bruce H. Hess
(74) *Attorney, Agent, or Firm*—Thompson Hine LLP

(57) ABSTRACT

An electron accepting developer useful for producing visible images by reaction with an electron donor in carbonless paper and photo- imaging systems, the developer comprising an acid-treated, water insoluble alkali metal-modified, inorganic oxide or an acid-treated molecular sieve.

35 Claims, No Drawings

DEVELOPER FOR USE WITH CARBONLESS COPY PAPER AND PHOTO IMAGING SYSTEM

This Application is a continuation of U.S. application Ser. No. 09/290,538, filed Apr. 12, 1999, now U.S. Pat. No. 6,242,167.

BACKGROUND OF INVENTION

The present invention relates to a color developer composition which is designed to be used with recording systems which employ colorless electron donating materials to form images.

Recording materials utilizing developer materials to produce colored images from colorless or substantially colorless electron donating materials are well-known. Specific examples of such recording materials include pressure sensitive carbonless copying paper, heat-sensitive recording paper, electrothermographic recording paper, Cycolor® photographic materials and the like. They are described in more detail in U.S. Pat. Nos. 2,712,507; 2,730,456; 2,730,457; 3,418,250; 3,432,327; 3,981,821; 3,993,831; 3,996,156; 3,996,405 and 4,000,087. These papers include a developer sheet (also referred to as a CF (coated front) sheet) comprising a substrate coated with an electron acceptor which reacts with a leuco dye transferred to the surface of the developer sheet to form an image thereon.

Much research has been directed to developing new and improved developers for use in the aforementioned recording materials. Representative examples of the developers that have been used include phenol derivatives and phenolic resins, biphenols, methylene bisdiphenols, phenol-formaldehyde novolak resins, metal processed novolak resins, salicylic acid derivatives and salts. See U.S. Pat. No. 3,934,070 to Kimura teaching salicyclic acid derivatives; U.S. Pat. No. 3,244,550 to Farnham teaching biphenols, diphenols, and resinous products containing them, and U.S. Pat. No. 3,244,549 to Farnham teaching phenol derivatives. Representative examples of phenol-formaldehyde condensates previously used in the art are described in numerous patents, including U.S. Pat. No. 3,672,935. Among color developers, phenol-formaldehyde condensates have been widely used because they exhibit excellent color development, good coating properties (rheology) and good water resistance. However, phenolic resins are somewhat colored materials and become even more colored as they are exposed to ambient conditions. Such discoloration is a very undesirable attribute in imaging systems where aesthetic appearance is of extreme importance. Fading of the image when exposed to extreme temperatures and humidity is also an undesirable trait of the currently developer materials. Therefore, it is a principal object of the present invention to provide an improved developer composition for use with recording materials which employ leuco dyes such as carbonless copy paper and photo imaging systems which overcome some of the deficiencies of prior art developers.

SUMMARY OF THE INVENTION

The invention is based upon the discovery that molecular sieves and certain alkali metal-containing water insoluble inorganic oxides, when treated with an acid, can be used as a developer for color formers in recording materials.

The developer material of the present invention may be used in any recording system in which a color precursor is reacted with a Lewis acid or electron accepting color developer. Such recording systems include pressure sensitive recording materials like carbonless paper, thermal recording systems and photosensitive systems like the Cycolor® imaging system described in U.S. Pat. No. 4,399,209 and related patents. It may be used in a self-contained system in which the color precursor and developer are in the same or different layers but present on the same support or it may be used in a transfer system containing a donor or imaging sheet and a developer sheet wherein the donor or imaging sheet contains an image-forming agent capable of reacting with the developer material to form an image. To produce a visible image, the donor or imaging sheet is assembled with the developer sheet and pressure is applied to the sheets to cause transfer of the image-forming agent to the developer sheet. It is particularly envisioned that the developer material of the present invention be coated on a substrate sheet to provide a developer sheet which is then used in association with an imaging sheet containing photosensitive microcapsules containing an image-forming agent. The developer material may also be utilized in a self-contained imaging format.

DETAILED DESCRIPTION

In accordance with the present invention, a new color developer has been discovered which overcomes many of the drawbacks of the currently used developers.

In one embodiment of the invention, the developer is an acid-treated, alkali metal-modified, inorganic oxide such as silicate, aluminate, borate, borosilicate, phosphate, sulfate, silicon oxide, etc. A typical example of these developers are compounds of the general formula:

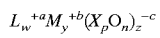

$$L_w^{+a} M_y^{+b} (X_p O_n)_z^{-c}$$

where L is lithium, sodium, potassium or hydrogen; M is zinc, magnesium or calcium; X is silicon, boron, phosphorus, aluminum, sulfur, titanium or tin; O is oxygen; n is 3 to 25 and p is 1 to 6; and each of w, y and z represents a numeral wherein w(a)+y(b)=z(c) such that the compound is electronically neutral. The general formula is a simplified definition of the compounds. More complex materials are possible because of the tendency of some of the anion forming atoms X to create condensed oxides. Examples of oxide anion structures include $(Si_3O_9)^{-6}$, $(Si_4O_{12})^{-8}$, $(Si_8O_{24})^{-16}$, $(Si_2O_5)^{-2}$, $(Si_6O_{17})^{-4}$, $(B_2O_5)^{-4}$, $(B_3O_6)^{-3}$, $(P_2O_7)^{-4}$, $(P_3O_{10})^{-5}$, $(P_3O_9)^{-3}$, $(S_2O_6)^{-2}$ etc.

In another embodiment of the invention, the developer is an acid-treated molecular sieve. Molecular sieves typically comprise a variety of compositions such as silicates, aluminosilicates, aluminophosphates, transitional aluminates, and the like. The inorganic oxide and molecular siene should be essentially water insoluble, i.e., less than 1% soluble in water.

The alkali metal-modified inorganic oxides can be prepared by a process which typically consists of heating the reactants together in air in a temperature range of about 200 to 1200° C. for several hours, the temperature used being dependent on the nature of the reactants. After this reaction is complete an acid treatment as discussed later is performed on the reaction product.

A hydrothermal crystallization process is used for preparing the molecular sieves.

This process typically involves of mixing the reactants in a solvent, usually water, and then heating the mixture in a closed reactor at 100 to 300° C. for several hours. This reaction is typically carried out in the presence of a templating agent, which provides a specific structure. Following the completion of this reaction, the product is treated with acid. This treatment is followed by a calcining operation. A variety of templates have been used to synthesize molecular sieves from molecular sieve precursors such as the silicate, aluminosilicate, and borosilicate family. Preferably, the molecular sieve precursor is a silicate such as tetraethylorthosilicate (TEOS), tetramethylammonium silicate, tetraethylammonium silicate, etc. Molecular sieves are prepared by crystallization in an aqueous reaction mixture containing an inorganic templating agent such as a nitrogen-containing organo-cation. By varying the synthesis conditions and the composition of the reaction mixture, different zeolites can be formed. The role of templating agents in the preparation of molecular sieves is well known. The positive charge of the organocation templating species is believed to interact with the negatively charged silicate subunits, resulting in the crystallization of the resultant molecular sieve. The organic cation also greatly affects the characteristics of the gel. These effects can range from modifying the gel pH to altering the interactions of the various components via changes in hydration (and thus solubilities of reagents) and other physical properties of the gel.

It has been observed that many of the organocations which have been used as templates for zeolite synthesis are conformationally flexible. These molecules can adopt many conformations in aqueous solution, therefore several templates can give rise to a particular crystalline product. Rollmann and Valyocsik, Zeolites 5, 123 (1985) describe how varying the chain length for a series of alpha, omega-linear diamines resulted in different intermediate-pore products. It has also been reported by M. D. Shannon et al., $Nature$ 353, 417–420 (1991) that three different products which have related framework topologies, can be formed from three linear bis-quaternary ammonium templates of varying chain lengths. Altering the structure of a conformationally rigid organic molecule can also lead to a change in the zeolite obtained, presumably due to the differing steric demands of each template. S. I. Zones, $Zeolites$ 9, 458.467 (1989) reported that in switching from 1,3-dimethylimidazolium hydroxide to 1,3-diisopropylimidazolium hydroxide as template, using the same starting gel ($SiO_2/Al_2O_3=100$), the former directs toward formation of ZSM-22 whereas the latter affords ZSM-23.

Crystalline zeolitic molecular sieves prepared by hydrothermal crystallization from reaction mixtures containing organic templating agents can, in general, be prepared in forms more highly siliceous than those which are synthesized in the absence of the organic reagents. It has been proposed that the crystallization mechanisms are different. In the case of the low-silica species, the mechanism involves the formation of stabilized metal cation aluminosilicate complexes and is controlled largely by the aluminate and aluminosilicate solution chemistry. In the case of the highly siliceous molecular sieves, a true templating or clathration mechanism is involved in which the organic reagent, typically an alkylammonium cation, forms complexes with silica via hydrogen bonding interactions. These complexes template or cause replication of the structure via stereo-specific hydrogen bonding interaction of the quaternary ammonium cation with the framework oxygens. Whatever the synthesis mechanism, the templated crystal structures in many instances can be directly synthesized over a very wide range of silica alumina ($SiO_2/Al_2O_3$) ratios. At the extreme upper end of the range, the compositions are essentially silica polymorphs containing no $AlO_2$ tetrahedra in their framework structure. Those highly siliceous molecular sieves, particularly those having $SiO_2/Al_2O_3$ molar ratios of 200 or greater, are highly hydrophobic and strongly organophilic. As such, they have found extensive use in molecular sieve separations involving organic substrates, particularly those in which water vapor cannot be entirely excluded from contacting the adsorbent.

In accordance with the invention, the water insoluble alkali metal-modified inorganic oxides and the molecular sieves are treated with a Lewis acid. The acid enhances the developing ability of the molecular sieve or inorganic oxide. Preferably, the acid is a Lewis acid such as aluminum halides, zinc halides, transition metal halides, tin halides, boron halides, borates, sulfur trioxide, etc. Mixtures of the above Lewis acids are also useful in treating the alkali metal-modified inorganic oxide and molecular sieve materials. The preferred Lewis acids include $AlCl_3$, $ZnCl_2$, $MgCl_2$, $SnCl_4$ and mixtures thereof. Other acids such as $HNO_3$ have been used successfully to treat the developer materials of the present invention.

The mechanism whereby the acid enhances the developing ability of the inorganic oxide or molecular sieve is not entirely clear. The Lewis acid cation may substitute for other cations in the oxide or sieve, or the Lewis acid may simply be physically absorbed within the oxide or molecular sieve. The treatment of the inorganic oxide or sieve is carried out by mixing the inorganic oxide or sieve with a solution containing about 10 to 20% by weight of the Lewis acid, allowing the mixture to stand for a suitable period of time, e.g., 1 to 2 hours, decanting the water, and drying in the case of the oxide or drying and calcining in the case of the sieve. Depending upon the nature of the oxide and the Lewis acid, the mixture may gel in which case there may not be water to decant. The concentration of the Lewis acid solution and the time the inorganic oxide or sieve stand in the acid can be adjusted to control the acidity of the acid treated product such that the product provides the desired reactivity with the color former and yields an image with good color density.

The developer materials of the present invention can be used alone, combined with each other, or in combination with other developer materials conventionally employed in carbonless paper. Examples of conventional developers with which the developer of the invention may be combined are clay minerals, e.g., acid clay, active clay, attapulgite, etc.; organic acids such as tannic acid, gallic acid, propyl gallate, etc.; acid polymers such as phenol-formaldehyde resins, phenol acetylene condensation resins, condensates between an organic carboxylic acid having at least one hydroxy group and formaldehyde, etc.; metal salts or aromatic carboxylic acids such as zinc salicylate, tin salicylate, zinc 2-hydroxy naphthoate, zinc 3,5 di-tert butyl salicylate, oil soluble metal salts of phenol-formaldehyde novolak resins (e.g., see U.S. Pat. Nos. 3,672,935; 3,732,120 and 3,737,410) such as zinc modified, oil soluble phenol-formaldehyde resin as disclosed in U.S. Pat. No. 3,732,120), zinc carbonate etc. and mixtures thereof.

To produce a developer sheet using the developer material of the present invention, the developer material, typically ground to a particle size of about 2 to about 10 microns, is dispersed in a coating liquid, for example water containing a small amount of a binder, and coated onto a support. The developer coating liquid is applied to the surface of the support using methods known in the art. For example, the developer layer may be formed by applying a coating composition on a support by air-knife coating, pure blade coating, rod blade coating, short dwell coating, curtain coating or die coating. As the support, there may be used paper, plastic film, synthetic paper, non-woven fabric and the like. The amount of the coating composition is not particularly limited, but is generally within the range of about 1 to 20 g/m² and, preferably about 2 to 10 g/m² dry weight. Due to the low viscosity of the coating formulation, high levels of solids may be added to the dispersion coating solvent. Levels of solids ranging between about 40 to about 70% may be achieved in accordance with the present invention.

A small amount of a binder is usually used to bind the color developer to a support such as paper or PET film. The binder employed may be a natural binder, a synthetic binder or a combination thereof. Illustrative examples of such binders include water-soluble polymers such as starches, e.g., oxidized starch, enzyme-modified starch, cation-modified starch, esterified starch and etherified starch; cellulose derivatives, e.g., methyl cellulose, ethyl cellulose, carboxymethyl cellulose, methoxy cellulose and hydroxyethyl cellulose; polyvinyl alcohols, e.g., completely or partially saponified polyvinyl alcohol, carboxy-modified polyvinyl alcohol, silicon-modified polyvinyl alcohol and acetoacetyl-modified polyvinyl alcohol; sodium salt of polyacrylic acid; polyacrylamide; polyvinylpyrrolidone; acrylic acid amide-acrylic ester copolymer; acrylic acid amide-acrylic ester-methacrylic acid copolymer; alkali salt of styrene-maleic anhydride copolymer; alkali salt of styrene-acrylic acid copolymer; alkali salt of ethylene-acrylic acid copolymer; alkali salt of isobutylene-maleic anhydride copolymer; sodium alginate; gelatin; casein; gum arabic; urea resins and melamine resin; and latexes such as polyvinylacetate latex, polyurethane latex, polyacrylic acid latex, polyacrylic ester latex, polybutymethacrylate latex, styrene-butadiene copolymer latex, vinyl chloride-vinyl acetate copolymer latex, etylene-vinyl acetate copolymer latex and styrene-butadiene-acrylate latex, butadiene copolymers, vinylidene chloride copolymers, carboxylated styrene-alkylalcohol copolymers, latex, maleic anhydride-styrene copolymer, etc. It is to be understood that all binders well known as film-forming materials can be used in this capacity. Typically, the binder is used in an amount of about 2 to 15% by weight and preferably about 5 to 10% by weight. Other conventional additives such as surfactants, ultraviolet absorbers, antioxidants, plasticizers, hardeners, etc. may be employed in carrying out the invention.

Further, for the purpose of increasing color developing ability and light resistance, an inorganic pigment may be added to the color developer. The inorganic pigment comprises aluminum silicate, zinc silicate, lead silicate, tin silicate, colloidal hydrated aluminum silicate, zeolite, bentonite, kaolinite active clay, acid clay, talc and the like. The amount of inorganic pigment employed is not critical, for example, more than 1 party by weight, preferably 10 to 1000 parts by weight per 100 parts by weight of the metal salt of polymer may be used.

As indicated above, the developer of the present invention can be used in association with any transfer image-forming system. For example, the present invention is particularly useful for preparing a carbonless manifold form. Carbonless paper is widely used in the forms industry. A typical carbonless form is made up of one sheet, known as a CB sheet, which is the first page of the form, and a second sheet, known as a CF sheet, which is the back page of the form. Where a form having more than two sheets is desired, as in the case where more than one copy is required, one or more sheets known as CFB sheets may be placed between the CF and the CB sheet. A CB sheet consists of a sheet of paper having a layer of microcapsules containing a color former coated on its back side, hence the designation CB or "coated back." A CF sheet consists of a sheet of paper carrying a layer of a developer material on its front side or "coated front" which reacts with the color former to produce a colored mark. A CFB sheet is coated on its front and back sides. The front is coated with developer and the back is coated with microcapsules. The manifold carbonless forms will usually comprise from about 2 to about 10 individual sheets and preferably from about 2 to about 4 individual sheets per form. To produce a visible image using the developer sheet of the present invention, the developer is brought into contact with an electron donating chromogenic color-forming agent. The color-forming agent is typically maintained in pressure rupturable microcapsules in a manner well known in the art.

Preferably the developer material of the present invention is used in the photosensitive imaging system described in U.S. Pat. No. 4,399,209 and others.

The invention is illustrated in more detail by the following non-limiting Example.

EXAMPLE 1
Molecular Sieve

A 25% water solution of cetyltrimethylammonium chloride $C_{16}H_{33}(CH_3)_3NCl$ (Aldrich Chemical Co.) was batch-exchanged through the hydroxide form of an IRA-400 ion exchange resin(Rohm and Haas) to produce a solution ($C_{16}H_{33}(CH_3)_3NCl/OH$) in which approximately 30% of the chloride ions have been replaced by hydroxide ions.

30.0 g of the $C_{16}H_{33}(CH_3)_3NCl/OH$ solution was mixed with 6.0 g of tertaethylorthosilicate (TEOS) in a polypropylene bottle and stirred for 1 hour at room temperature. The bottle (loose cap) was then placed in a 100° C. steam box for 48 hours. The sample was then dried at room temperature. The dry sample was then placed in a tube furnace and heated under $N_2$ flow at 540° C. for one hour. The gas flow was then switched to air and the heating was continued for and addition 6 hours. A white solid resulted. The white solid was then reacted with a 10% $HNO_3$ solution for 16 hours. The mixture was filtered and washed with water. The white solid was dried at 120° C. in air. The material was tested using a spot test method in which a sample of the powdered material is contacted with TMPTA solutions of three different color precursors, cyan, magenta and yellow. Color was developed with all three precursors in the spot test.

EXAMPLE 2
Molecular Sieve 20.0 g of a $C_{16}H_{33}(CH_3)_3NCl/OH$ solution (prepared as in Example #1) was mixed with 0.42 g of $NaAlO_2$. Then 10.0 g of a 25% tetramethylammoniumsilicate solution (Aldrich) was added to the mixture. This addition was followed by 2.5 g of fumed silica (Aldrich). The resulting mixture was placed in a 125 mL closed Parr Reactor and heated for 24 hours at 120° C. The mixture was then filtered and washed with water. The solid was dried at 120° C. The dried solid was then treated with a 10% $HNO_3$ solution over night. Following the acid treatment the sample was filtered and washed with water and dried at 120° C. A heat treatment of the material was then carried out by heating the sample in a tube furnace under $N_2$ flow at 450° C. followed by heating in air for 3 hours. The sample was then transferred to an oven and was heated at 500° C. in air for 8 hrs. The sample was tested via the spot method and exhibited color development.

EXAMPLE 3
Molecular Sieve 20.0 g of a $C16H_{33}(CH_3)_3NCl/OH$ solution (prepared as in Example #1) was mixed with 0.68 g of $ZnCl_2$, 10.0 g of a 25% tetramethylammoniumsilicate solution (Aldrich), 2.5 g of fumed silica (Aldrich) and 0.42 g LiOH.H$_2$O. This mixture was then placed in a closed 125 ml Parr reactor and heated at 120° C. for 24 hours. The mixture was filtered and the white solid obtained was washed with water and ethanol. The product was then dried at 120° C. The sample was then added to 100 ml of a 10% HNO$_3$ solution and stirred at room temperature over night. The mixture was filtered and the solid washed with water. Drying at 120° C. was the next process step. Finally the sample was heated under N$_2$ flow in a tube furnace at 500° C. for one hour, followed by heating in air at 500° C. for 10 hours. The sample was tested via the spot method and exhibited color development.

EXAMPLE 4

Molecular Sieve 60.0 g of a C$_{16}$H$_{33}$(CH$_3$)$_3$NCl/OH solution (prepared as in Example #1) was mixed with 3.30 g Na$_2$SnO$_3$, 30.0 g of a 25% tetramethylammoniumsilicate solution (Aldrich) and 7.5 g of fumed silica (Aldrich). The mixture was placed in a closed 300 mL Parr reactor and heated at 120° C. for 39 hours. The resulting mixture was filtered and the solid was washed with water and ethanol. The solid was dried at 120° C. and then treated with 400ml of a 20% HNO$_3$ solution for 20 hours. The mixture was filtered and the solid was washed with water and ethanol. The sample was dried at 120° C. A heat treatment consisting of heating under N$_2$ at 500° C. for 3 hours followed by heating in air at 500° C. for 14 hours completed the material preparation. The sample was tested via the spot method and exhibited color development.

EXAMPLE 5

Molecular Sieve 60.0 g of a C$_{16}$H$_{33}$(CH$_3$)$_3$NCl/OH solution (prepared as in Example #1) was mixed with 1.26 g NaAlO$_2$ and 30.0 g of a 25% tetramethylammoniumsilicate solution (Aldrich). Then 7.50 g of fumed silica (Aldrich) was added to the mixture. The resulting mixture was placed in a closed 300 mL Parr reactor and heated at 120° C. for 24 hours. The white reaction product was collected on a filter and washed with water. The product was then heated in air with the following schedule, 3 hours 200° C., 1 hour 300°, 1 hour 400°, and 8 hours at 500° C. This material developed color very well in a spot test. The material was coated onto a plastic sheet using a three per cent PVA binder. It was then imaged using a commercial carbonless CB sheet. A black image was produced.

One half of the product was treated with 200 ml of a 25% ZnCl$_2$ for 2 days. The mixture was then filtered and the solid washed with water. The sample was dried at 125° C. The sample was tested via the spot method and exhibited color development. The material was also tested in a carbonless system and a black image was obtained.

EXAMPLE 6

Lithium Zinc Silicate, Li$_x$Zn$_y$(SiO$_4$)$_4$

In the amounts shown in the table below, lithium carbonate (Aldrich Chemical Co.), zinc oxide (Aldrich Chemical Co.) and silica (Davison Chemical, Grace Division, Grade 22 60 Å, 60×200 mesh) were ground in a mortar and then placed in an alumina crucible and heated to 1100° C. in air for 16 hours. Once cooled, the materials were treated with a 10% HNO$_3$ solution (5 g/25–30 mL solution) for a period of 8–16 hours. The material was filtered, washed with distilled water, and dried at 110° C. for 3–6 hours.

| Sample | | | | |
|---|---|---|---|---|
| 6A | x = 14, y = 1 | 4.30 g Li$_2$CO$_3$ | 0.68 g ZnO | 2.00 g SiO$_2$ |
| 6B | x = 12, y = 2 | 3.69 g Li$_2$CO$_3$ | 1.35 g ZnO | 2.00 g SiO$_2$ |
| 6C | x = 10, y = 3 | 3.07 g Li$_2$CO$_3$ | 2.03 g ZnO | 2.00 g SiO$_2$ |
| 6D | x = 8, y = 4 | 2.46 g Li$_2$CO$_3$ | 2.71 g ZnO | 2.00 g SiO$_2$ |
| 6E | x = 6, y = 5 | 1.84 g Li$_2$CO$_3$ | 3.39 g ZnO | 2.00 g SiO$_2$ |
| 6F | x = 4, y = 6 | 1.23 g Li$_2$CO$_3$ | 4.06 g ZnO | 2.00 g SiO$_2$ |
| 6G | x = 2, y = 7 | 0.61 g Li$_2$CO$_3$ | 4.74 g ZnO | 2.00 g SiO$_2$ |

All of the above samples were tested via the spot method and exhibited color development.

EXAMPLE 7

Lithium Magnesium Silicate, Li$_x$Mg$_y$(SiO$_4$)$_4$

In the shown in the table below, lithium carbonate (Aldrich Chemical Co.), magnesium oxide (Aldrich Chemical Co.) and silica (Davison Chemical, Grace Division, Grade 22 60 Å, 60×200 mesh) were ground in a mortar and then placed in an alumina crucible and heated to 1100° C. in air for 16 hours. Once cooled, the materials were treated with a 10% HNO$_3$ solution (5 g/25–30 mL solution) for a period of 8–16 hours. The material was filtered, washed with distilled water, and dried at 110° C. for 3–6 hours.

| 7A | x = 14, y = 1 | 4.30 g Li$_2$CO$_3$ | 0.34 g MgO | 2.00 g SiO$_2$ |
|---|---|---|---|---|
| 7B | x = 12, y = 2 | 3.69 g Li$_2$CO$_3$ | 0.67 g MgO | 2.00 g SiO$_2$ |
| 7C | x = 10, y = 3 | 3.07 g Li$_2$CO$_3$ | 1.01 g MgO | 2.00 g SiO$_2$ |
| 7D | x = 8, y = 4 | 2.46 g Li$_2$CO$_3$ | 1.34 g MgO | 2.00 g SiO$_2$ |
| 7E | x = 6, y = 5 | 1.84 g Li$_2$CO$_3$ | 1.68 g MgO | 2.00 g SiO$_2$ |
| 7F | x = 4, y = 6 | 1.23 g Li$_2$CO$_3$ | 2.01 g MgO | 2.00 g SiO$_2$ |
| 7G | x = 2, y = 7 | 0.61 g Li$_2$CO$_3$ | 2.35 g MgO | 2.00 g SiO$_2$ |

The above samples were tested via the spot method and exhibited color development.

EXAMPLE 8

Lithium Zinc Silicate, Li$_4$Zn$_3$Si$_2$O$_9$

In the amounts shown in the table below, lithium carbonate (Aldrich Chemical Co.), zinc oxide (Aldrich Chemical Co.) and silica (see chart for silica type) were ground in a mortar. Samples 12E–I were mixed with minimal water to form a paste prior to heating. The paste was placed in an alumina crucible and heated to 100° C. for 4 hours followed by 1100° C. in air for 10–13 hours. Samples 12A, 12C–D did not receive the 4 hour heating at 100° C. Sample 12B had the following heating regime: 950° C. for 16 hours, followed by 1100° C. for 4 hours. Once cooled, the materials were treated with a 20% HNO$_3$ solution (5 g/25–30 mL solution) for a period of 8–16 hours. The material was filtered, washed with distilled water, and dried at 110° C. for 3–6 hours.

| 8A | 24.60 g Li$_2$CO$_3$ | 40.63 g ZnO | 20.00 g SiO$_2$ |
|---|---|---|---|
| Davison Chemical, Grace Division, Grade 22 60 Å, 60 × 200 mesh | | | |
| 8B | 3.69 g Li$_2$CO$_3$ | 6.09 g ZnO | 3.00 g SiO$_2$ |
| Davison Chemical, Grace Division, Grade 22 60 Å, 60 × 200 mesh | | | |
| 8C | 1.23 g Li$_2$CO$_3$ | 4.06 g ZnO | 2.00 g SiO$_2$ |
| Davison Chemical, Grace Division, Grade 22 60 Å, 60 × 200 mesh | | | |
| 8D | 6.15 g Li$_2$CO$_3$ | 20.3 g ZnO | 10.00 g SiO$_2$ |
| Davison Chemical, Grace Division, Grade 22 60 Å, 60 × 200 mesh | | | |
| 8E | 6.15 g Li$_2$CO$_3$ | 20.30 g ZnO | 10.00 g SiO$_2$ |
| Davison Chemical, Grace Division, Grade 22 60 Å, 60 × 200 mesh | | | |
| 8F | 6.15 g Li$_2$CO$_3$ | 20.30 g ZnO | 10.00 g SiO$_2$ |
| Synthetic Amorphous Precipitated Silica (Sipernat-22), Degussa Corp. | | | |

-continued

| 8G | 6.15 g $Li_2CO_3$ | 20.30 g ZnO | 10.00 g $SiO_2$ |
|---|---|---|---|
| | Amorphous Precipitated Silica, FK-310, Degussa Corp. | | |
| 8H | 18.45 g $Li_2CO_3$ | 60.90 g ZnO | 30.00 g $SiO_2$ |
| | Synthetic Amorphous Precipitated Silica (Sipernat-22), Degussa Corp. | | |
| 8I | 18.45 g $Li_2CO_3$ | 60.90 g ZnO | 30.00 g $SiO_2$ |
| | Synthetic Amorphous Precipitated Silica (Sipernat-22), Degussa Corp. | | |

The above samples were tested via the spot method and exhibited color development.

After cooling, Example 8A was divided into two samples and treated with a 10% $SnCl_4$ and a 10% $ZnCl_2$ solution for 16 hours, respectively. The materials were washed with distilled water and dried at 110° C. for 3–6 hours. Both samples were tested via the spot method and exhibited color development.

EXAMPLE 9

Lithium Aluminum Zinc Silicate, $Li_4Al_xZn_3Si_{2-x}O_{9-0.5x}$

In the amounts shown in the table below, lithium carbonate (Aldrich Chemical Co.), zinc oxide (Aldrich Chemical Co.), aluminum hydroxide (Alfa-Aesar) and silica (see chart for silica type) were ground in a mortar. Samples 13E–13H were mixed with minimal water to form a paste prior to heating. All samples were heated in an alumina crucible. Samples 13A–13B were heated to 950° C. in air for 16 hours, followed by heating at 1100° C. for 4 hours, whereas samples 13C–13H were heated at 1100° C. for 10–16 hours. Once cooled, the materials

| 9A | x = 0.5 | 3.69 g $Li_2CO_3$ | 6.09 g ZnO | 1.24 g $Al(OH)_3$ | 2.25 g $SiO_2$ |
|---|---|---|---|---|---|
| | Davison Chemical, Grace Division, Grade 22 60 Å, 60 × 200 mesh | | | | |
| 9B | x = 1.0 | 3.69 g $Li_2CO_3$ | 6.09 g ZnO | 2.48 g $Al(OH)_3$ | 1.50 g $SiO_2$ |
| | Davison Chemical, Grace Division, Grade 22 60 Å, 60 × 200 mesh | | | | |
| 9C | x = 0.1 | 1.51 g $Li_2CO_3$ | 5.00 g ZnO | 0.20 g $Al(OH)_3$ | 2.34 g $SiO_2$ |
| | Davison Chemical, Grace Division, Grade 22 60 Å, 60 × 200 mesh | | | | |
| 9D | x = 0.1 | 1.23 g $Li_2CO_3$ | 4.06 g ZnO | 0.165 g $Al(OH)_3$ | 1.90 g fumed $SiO_2$ |
| | Aldrich Chemical Co., 0.014 µµ particle size | | | | |
| 9E | x = 0.1 | 6.15 g $Li_2CO_3$ | 20.30 g ZnO | 0.825 g $Al(OH)_3$ | 9.50 g $SiO_2$ |
| | Davison Chemical, Grace Division, Grade 22 60 Å, 60 × 200 mesh | | | | |
| 9F | x = 0.1 | 6.15 g $Li_2CO_3$ | 20.30 g ZnO | 0.825 g $Al(OH)_3$ | 9.50 g fumed $SiO_2$ |
| | Aldrich Chemical Co., 0.014 µµ particle size | | | | |
| 9G | x = 0.1 | 6.15 g $Li_2CO_3$ | 20.30 g ZnO | 0.825 g $Al(OH)_3$ | 9.50 g $SiO_2$ |
| | Synthetic Amorphous Precipitated Silica (Sipernat-22), Degussa Corp. | | | | |
| 9H | x = 0.1 | 6.15 g $Li_2CO_3$ | 20.30 g ZnO | 0.825 g $Al(OH)_3$ | 9.50 g $SiO_2$ |
| | Amorphous Precipitated Silica, FK-310, Degussa Corp. | | | | |

The above samples were tested via the spot method and exhibited color development.

EXAMPLE 10

Lithium Zinc Borosilicate, $Li_4B_xZn_3Si_{2-x}O_{9-0.5x}$

In the amounts in the table below, lithium carbonate (Aldrich Chemical Co.), zinc oxide (Aldrich Chemical Co.), boric acid (Aldrich Chemical Co.) and silica (see chart for silica type) were ground in a mortar. Samples 16D–16G, 16I were mixed with water to form a paste prior to heating. The powder or paste was then placed in an alumina crucible and heated to 950° C. in air for 16 hours, followed by heating at 1100° C. for 4 hours for samples 14A–B whereas samples 14C–14I were heated to 1100° C. in air for 10–12 hours. Once cooled, the materials were treated with a 10% $HNO_3$ solution (5 g/25–30 mL solution) for a period of 8–16 hours. The samples were filtered, washed with distilled water, and dried at 110° C. for 3–6 hours.

| 10A | x = 0.5 | 3.69 g $Li_2CO_3$ | 6.09 g ZnO | 0.77 g $H_3BO_3$ | 2.25 g $SiO_2$ |
|---|---|---|---|---|---|
| | Davison Chemical, Grace Division, Grade 22 60 Å, 60 × 200 mesh | | | | |
| 10B | x = 1.0 | 3.69 g $Li_2CO_3$ | 6.09 g ZnO | 1.54 g $H_3BO_3$ | 1.50 g $SiO_2$ |
| | Davison Chemical, Grace Division, Grade 22 60 Å, 60 × 200 mesh | | | | |
| 10C | x = 0.1 | 1.51 g $Li_2CO_3$ | 5.00 g ZnO | 0.13 g $H_3BO_3$ | 2.34 g fumed $SiO_2$ |
| | Aldrich Chemical Co., 0.014 µµ particle size | | | | |
| 10D | x = 0.1 | 6.15 g $Li_2CO_3$ | 20.30 g ZnO | 0.51 g $H_3BO_3$ | 9.50 g $SiO_2$ |
| | Davison Chemical, Grace Division, Grade 22 60 Å, 60 × 200 mesh | | | | |
| 10B | x = 0.1 | 6.15 g $Li_2CO_3$ | 20.30 g ZnO | 0.51 g $H_3BO_3$ | 9.50 g fumed $SiO_2$ |
| | Aldrich Chemical Co., 0.014 µµ particle size | | | | |
| 10F | x = 0.1 | 6.15 g $Li_2CO_3$ | 20.30 g ZnO | 0.51 g $H_3BO_3$ | 9.50 g $SiO_2$ |
| | Synthetic Amorphous Precipitated Silica (Sipernat-22), Degussa Corp. | | | | |
| 10G | x = 0.1 | 6.15 g $Li_2CO_3$ | 20.30 g ZnO | 0.51 g $H_3BO_3$ | 9.50 g $SiO_2$ |
| | Amorphous Precipitated Silica, FK-310, Degussa Corp. | | | | |
| 10H | x = 0.1 | 18.16 g $Li_2CO_3$ | 60.00 g ZnO | 1.52 g $H_3BO_3$ | 28.06 g $SiO_2$ |
| | Davison Chemical, Grace Division, Grade 22 60 Å, 60 × 200 mesh | | | | |
| 10I | x = 0.1 | 18.16 g $Li_2CO_3$ | 60.00 g ZnO | 1.52 g $H_3BO_3$ | 28.06 g fumed $SiO_2$ |
| | Aldrich Chemical Co., 0.014 µµ particle size | | | | |
| 10J | x = 0.1 | 18.16 g $Li_2CO_3$ | 60.00 g ZnO | 1.52 g $H_3BO_3$ | 28.06 g $SiO_2$ |
| | Synthetic Amorphous Precipitated Silica (Sipernat-22), Degussa Corp. | | | | |

The above samples were tested via the spot method and exhibited color development.

EXAMPLE 11

Lithium Titanium Zinc Silicate, $Li_4Zn_6(Si_{1.9}Ti_{0.1}O_4)_4$

In a mortar, 1.51 g of lithium carbonate (Aldrich Chemical Co.), 5.00 g of zinc oxide (Aldrich Chemical Co.), 2.34 g of silica (Davison Chemical, Grace Division, Grade 22 60 Å, 60×200 mesh) and 0.16 g of titanium dioxide (Aldrich Chemical Co.) were ground and placed in an alumina crucible and heated to 1100° C. in air for 16 hours. Once cooled, the materials were treated with a 10% $HNO_3$ solution (5 g/25–30 mL solution) for a period of 8–16 hours. The sample was filtered, washed with distilled water, and dried at 110° C. for 3–6 hours. The above sample was tested via the spot method and exhibited color development.

EXAMPLE 12

Lithium Tin Zinc Silicate, $Li_4Zn_6(Si_{1.9}Sn_{0.1}O_4)_4$

In a mortar, 1.51 g of lithium carbonate (Aldrich Chemical Co.), 5.00 g of zinc oxide (Aldrich Chemical Co.), 2.34 g of silica (Davison Chemical, Grace Division, Grade 22 60 Å, 60×200 mesh) and 0.31 g of tin dioxide (Aldrich Chemical Co.) were ground and placed in an alumina crucible and heated to 1100° C. in air for 16 hours. Once cooled, the materials were treated with a 10% $HNO_3$ solution (5 g/25–30 mL solution) for a period of 8–16 hours. The sample was filtered, washed with distilled water, and dried at 110° C. for 3–6 hours. The above sample was tested via the spot method and exhibited color development.

EXAMPLE 13

Lithium Aluminum Zinc Silicate, $Li_4Zn_6(Si_{1-n}Al_nO_{(4-0.5n)})_4$

In the amounts shown in the table below, aluminum hydroxide (Alfa-Aesar), silica (Davison Chemical, Grace Division, Grade 22 60 Å, 60×200 mesh), lithium carbonate (Aldrich Chemical Co.) and zinc oxide (Aldrich Chemical Co.), were ground in a mortar and then placed in an alumina crucible and heated to 110° C. for 12 hours. Once cooled, the materials were treated with a 10% $HNO_3$ solution (5 g/25–30 mL solution) for a period of 8–16 hours. The samples were filtered, washed with distilled water, and dried at 110° C. for 3–6 hours.

| | | | | |
|---|---|---|---|---|
| 13A, n = 0 | 0.00 g Al(OH)$_3$ | 2.00 g SiO$_2$ | 1.23 g Li$_2$CO$_3$ | 4.06 g ZnO |
| 13B, n = 0.01 | 0.033 g Al(OH)$_3$ | 1.98 g SiO$_2$ | 1.23 g Li$_2$CO$_3$ | 4.06 g ZnO |
| 13C, n = 0.03 | 0.099 g Al(OH)$_3$ | 1.94 g SiO$_2$ | 1.23 g Li$_2$CO$_3$ | 4.06 g ZnO |
| 13D, n = 0.05 | 0.165 g Al(OH)$_3$ | 1.90 g SiO$_2$ | 1.23 g Li$_2$CO$_3$ | 4.06 g ZnO |
| 13E, n = 0.07 | 0.231 g Al(OH)$_3$ | 1.86 g SiO$_2$ | 1.23 g Li$_2$CO$_3$ | 4.06 g ZnO |
| 13F, n = 0.09 | 0.298 g Al(OH)$_3$ | 1.82 g SiO$_2$ | 1.23 g Li$_2$CO$_3$ | 4.06 g ZnO |
| 13G, n = 0.11 | 0.364 g Al(OH)$_3$ | 1.78 g SiO$_2$ | 1.23 g Li$_2$CO$_3$ | 4.06 g ZnO |
| 13H, n = 0.13 | 0.430 g Al(OH)$_3$ | 1.74 g SiO$_2$ | 1.23 g Li$_2$CO$_3$ | 4.06 g ZnO |
| 13I, n = 0.15 | 0.496 g Al(OH)$_3$ | 1.70 g SiO$_2$ | 1.23 g Li$_2$CO$_3$ | 4.06 g ZnO |

The above samples were tested via the spot method and exhibited color development.

EXAMPLE 14
Lithium Zinc Silicate, $Li_4Zn_3Si_2O_9$

In the amounts shown in the table below, lithium carbonate (Aldrich Chemical Co.), zinc oxide (Aldrich Chemical Co.) and fumed silica (Aldrich Chemical Co., 0.014 μμ particle size) were ground in a mortar and placed in an alumina crucible and heated in air at 110° C. for 10–12 hours. Once cooled, the materials were treated with a 20% $HNO_3$ solution (5 g/25–30 mL solution) for a period of 8–16 hours. The samples were filtered, washed with distilled water, and dried at 110° C. for 3–6 hours.

| | | | |
|---|---|---|---|
| 14A | 2.00 g SiO$_2$ | 1.23 g Li$_2$CO$_3$ | 4.06 g ZnO |
| 14B | 10.00 g SiO$_2$ | 6.15 g Li$_2$CO$_3$ | 20.3 g ZnO |

The above samples were tested via the spot method and exhibited color development.

EXAMPLE 15
Lithium Zinc Aluminate

In a mortar, 0.13 g of lithium carbonate (Aldrich Chemical Co.), 0.578 g of zinc oxide (Aldrich Chemical Co.), and 20.00 g aluminum hydroxide (Alfa-Aesar) were ground and placed in an alumina crucible and heated to 1000° C. in air for 12–16 hours. Once cooled, the materials were treated with a 10% $HNO_3$ solution (5 g/25–30 mL solution) for a period of 8–16 hours. The material was filtered, washed with distilled water, and dried at 110° C. for 3–6 hours. The above sample was tested via the spot method and exhibited color development.

EXAMPLE 16
Lithium Zinc Borate

In the amounts shown in the table below, a lithium source (Aldrich Chemical Co.), zinc oxide (Aldrich Chemical Co.) and boric acid (Aldrich Chemical Co.) were ground in a mortar and placed in an alumina crucible and heated in air at 425° C. for 12–16 hours. Once cooled, the materials were treated with a 10% or a 20% $HNO_3$ solution (5 g/25–30 mL solution) for a period of 8–16 hours. The material was filtered, washed with distilled water, and dried at 110° C. for 3–6 hours.

| | | | |
|---|---|---|---|
| 16A | 0.18 g LiOH | 0.70 g ZnO | 15.00 g H$_3$BO$_3$ |
| 16B | 0.71 g Li$_2$CO$_3$ | 2.80 g ZnO | 60.00 g H$_3$BO$_3$ |
| 16C | 0.18 g Li$_2$CO$_3$ | 1.40 g ZnO | 15.00 g H$_3$BO$_3$ |
| 16D | 0.38 g LiOH | 1.46 g ZnO | 15.00 g H$_3$BO$_3$ |
| 16E | 0.60 g LiOH | 2.32 g ZnO | 15.00 g H$_3$BO$_3$ |
| 16F | 0.85 g LiOH | 3.29 g ZnO | 15.00 g H$_3$BO$_3$ |
| 16G | 1.13 g LiOH | 4.39 g ZnO | 15.00 g H$_3$BO$_3$ |
| 16H | 1.45 g LiOH | 5.64 g ZnO | 15.00 g H$_3$BO$_3$ |

The above samples were tested via the spot method and exhibited color development.

EXAMPLE 17
Lithium Tin Borate

In the amounts shown in the table below, lithium hydroxide monohydrate (Aldrich Chemical Co.), tin dioxide (Aldrich Chemical Co.) and boric acid (Aldrich Chemical Co.) were ground in a mortar and placed in an alumina crucible and heated in air at 425° C. for 12–16 hours. Once cooled, the materials were treated with a 10% or a 20% $HNO_3$ solution (5 g/25–30 mL solution) for a period of 8–16 hours. The sample was filtered, washed with distilled water, and dried at 110° C. for 3–6 hours.

| | | | |
|---|---|---|---|
| 17A | 0.38 g LiOH | 2.70 g SnO$_2$ | 15.00 g H$_3$BO$_3$ |
| 17B | 0.60 g LiOH | 4.30 g SnO$_2$ | 15.00 g H$_3$BO$_3$ |
| 17C | 0.85 g LiOH | 6.09 g SnO$_2$ | 15.00 g H$_3$BO$_3$ |
| 17D | 1.13 g LiOH | 8.13 g SnO$_2$ | 15.00 g H$_3$BO$_3$ |
| 17E | 1.45 g LiOH | 10.44 g SnO$_2$ | 15.00 g H$_3$BO$_3$ |

The above samples were tested via the spot method and exhibited color development.

EXAMPLE 18
Lithium Zinc Silicon Boron Oxide

In the amounts shown in the table below, lithium hydroxide monohydrate (Aldrich Chemical Co.), zinc oxide (Aldrich Chemical Co.), boric acid (Aldrich Chemical Co.) and silicic acid (Aldrich Chemical Co.) were ground in a mortar and placed in an alumina crucible. Samples 22A–C were heated in air at 450° C. for 12–16 hours. Samples 22B–C received an additional heating at 500° C. in air for 8 hours. Samples 22D–Q were heated in air at 500° C. for 12 hours. Once cooled, the materials were treated with a 10% or a 20% $HNO_3$ solution (5 g/25–30 mL solution) for a period of 8–16 hours. The samples were filtered, washed with distilled water, and dried at 110° C. for 3–6 hours.

| | | | | |
|---|---|---|---|---|
| 18A | 0.38 g LiOH | 1.46 g ZnO | 10.00 g H$_3$BO$_3$ | 6.32 g H$_2$SiO$_3$ |
| 18B | 0.38 g LiOH | 1.46 g ZnO | 10.00 g H$_3$BO$_3$ | 3.61 g H$_2$SiO$_3$ |
| 18C | 0.38 g LiOH | 1.46 g ZnO | 10.00 g H$_3$BO$_3$ | 4.54 g H$_2$SiO$_3$ |
| 18D | 0.38 g LiOH | 1.46 g ZnO | 10.00 g H$_3$BO$_3$ | 6.32 g H$_2$SiO$_3$ |
| 18E | 0.38 g LiOH | 1.46 g ZnO | 10.00 g H$_3$BO$_3$ | 2.00 g H$_2$SiO$_3$ |
| 18F | 0.38 g LiOH | 1.46 g ZnO | 10.00 g H$_3$BO$_3$ | 1.00 g H$_2$SiO$_3$ |
| 18G | 0.38 g LiOH | 1.46 g ZnO | 10.00 g H$_3$BO$_3$ | 8.10 g H$_2$SiO$_3$ |
| 18H | 0.38 g LiOH | 1.46 g ZnO | 10.00 g H$_3$BO$_3$ | 10.00 g H$_2$SiO$_3$ |
| 18I | 0.38 g LiOH | 1.00 g ZnO | 10.00 g H$_3$BO$_3$ | 3.61 g H$_2$SiO$_3$ |
| 18J | 0.26 g LiOH | 1.00 g ZnO | 10.00 g H$_3$BO$_3$ | 3.61 g H$_2$SiO$_3$ |

| | | | | |
|---|---|---|---|---|
| 18K | 0.38 g LiOH | 2.00 g ZnO | 10.00 g $H_3BO_3$ | 3.6l g $H_2SiO_3$ |
| 18L | 0.52 g LiOH | 2.00 g ZnO | 10.00 g $H_3BO_3$ | 3.6l g $H_2SiO_3$ |
| 18M | 0.38 g LiOH | 3.00 g ZnO | 10.00 g $H_3BO_3$ | 3.6l g $H_2SiO_3$ |
| 18N | 0.78 g LiOH | 3.00 g ZnO | 10.00 g $H_3BO_3$ | 3.6l g $H_2SiO_3$ |
| 18O | 0.38 g LiOH | 4.00 g ZnO | 10.00 g $H_3BO_3$ | 3.6l g $H_2SiO_3$ |
| 18P | 1.04 g LiOH | 4.00 g ZnO | 10.00 g $H_3BO_3$ | 3.6l g $H_2SiO_3$ |
| 18Q | 3.04 g LiOH | 32.00 g ZnO | 80.00 g $H_3BO_3$ | 28.80 g $H_2SiO_3$ |

The above samples were tested via the spot method and exhibited color development.

EXAMPLE 19

Lithium Zinc Phosphate, $Li_3Zn_xPO_{x+4}$

In the amounts shown in the table below, lithium phosphate, tribasic (Aldrich Chemical Co.) and zinc oxide (Aldrich Chemical Co.) were ground in a mortar and placed in an alumina crucible and heated in air at 800° C. for 12–16 hours. Once cooled, the materials were treated with a 10% $HNO_3$ solution (5 g/25–30 mL solution) for a period of 8–16 hours. The samples were filtered, washed with distilled water, and dried at 110° C. for 3–6 hours.

| | | | |
|---|---|---|---|
| 19A | x = 1 | 11.58 g $Li_3PO_4$ | 8.14 g ZnO |
| 19B | x = 2 | 11.58 g $Li_3PO_4$ | 16.28 g ZnO |
| 19C | x = 3 | 5.79 g $Li_3PO_4$ | 16.28 g ZnO |

The above samples were tested via the spot method and exhibited color development.

EXAMPLE 20

Lithium Zinc Silicon Phosphate

In amounts shown in the table below, lithium phosphate, tribasic (Aldrich Chemical Co.), zinc oxide (Aldrich Chemical Co.) and silicic acid (Aldrich Chemical Co.) were ground in a mortar and placed in an alumina crucible and heated to 800° C. in air for 16 hours. Once cooled, the materials were treated with a 10% $HNO_3$ solution (5 g/25–30 mL solution) for a period of 8–16 hours. The samples were filtered, washed with distilled water, and dried at 110° C. for 3–6 hours.

| | | | |
|---|---|---|---|
| 20A | 11.58 g $Li_3PO_4$ | 6.76 g ZnO | 1.20 g $H_2SiO_3$ |
| 20B | 8.90 g $Li_3PO_4$ | 1.88 g ZnO | 4.20 g $H_2SiO_3$ |
| 20C | 8.90 g $Li_3PO_4$ | 3.13 g ZnO | 3.00 g $H_2SiO_3$ |
| 20D | 8.90 g $Li_3PO_4$ | 4.38 g ZnO | 1.80 g $H_2SiO_3$ |

The above samples were tested via the spot method and exhibited color development.

EXAMPLE 21

Lithium Zinc Sulfate, $Li_2Zn_4SO_{x+4}$

In the amounts shown in the table below, anhydrous lithium sulfate (Alfa-Aesar) and zinc oxide (Aldrich Chemical Co.) were ground in a mortar and placed in an alumina crucible and heated in air at 800° C. for 12–16 hours. Once cooled, the materials were treated with a 10% $HNO_3$ solution (5 g/25–30 mL solution) for a period of 8–16 hours. The material was filtered, washed with distilled water, and dried at 110° C. for 3–6 hours.

| | | | |
|---|---|---|---|
| 21A | x = 1 | 10.99 g $Li_2SO_4$ | 8.14 g ZnO |
| 21B | x = 2 | 5.50 g $Li_2SO_4$ | 8.14 g ZnO |
| 21C | x = 3 | 2.75 g $Li_2SO_4$ | 8.14 g ZnO |

The above samples were tested via the spot method and exhibited color development.

EXAMPLE 22

Lithium Zinc Silicon Sulfate

In the amounts shown in the table below, anhydrous lithium sulfate (Alfa-Aesar), zinc oxide (Aldrich Chemical Co.) and silicic acid (Aldrich Chemical Co.) were ground in a mortar and placed in an alumina crucible and heated to 800° C. in air for 16 hours. Once cooled, the materials were treated with a 10% $HNO_3$ solution (5 g/25–30 mL solution) for a period of 8–16 hours. The samples were filtered, washed with distilled water, and dried at 110° C. for 3–6 hours.

| | | | |
|---|---|---|---|
| 22A | 10.99 g $Li_2SO_4$ | 6.76 g ZnO | 1.20 g $H_2SiO_3$ |
| 22B | 8.45 g $Li_2SO_4$ | 1.88 g ZnO | 4.20 g $H_2SiO_3$ |
| 22C | 8.45 g $Li_2SO_4$ | 3.13 g ZnO | 3.00 g $H_2SiO_3$ |
| 22D | 8.45 g $Li_2SO_4$ | 4.38 g ZnO | 1.80 g $H_2SiO_3$ |

The above samples were tested via the spot method and exhibited color development.

EXAMPLE 23

Lithium Hydrogen Zinc Phosphate, $Li_2H_3ZnPO_4$

In a mortar, 8.39 g of lithium hydroxide monohydrate (Aldrich Chemical Co.), 8.14 g of zinc oxide (Aldrich Chemical Co.), and 13.21 g of ammonium phosphate, dibasic (EM Science) were ground and placed in an alumina crucible and heated to 500° C. in air for 16 hours. Once cooled, the materials were treated with a 25% $ZnCl_2$ solution (5 g/25–30 mL solution) for a period of 8–16 hours. The sample was filtered, washed with distilled water, and dried at 110° C. for 3–6 hours. The sample was tested via the spot method and exhibited color development.

EXAMPLE 24

Lithium Hydrogen Zinc Boron Phosphate

In a mortar, 8.39 g of lithium hydroxide monohydrate (Aldrich Chemical Co.), 6.76 g of zinc oxide (Aldrich Chemical Co.), 1.24 g of boric acid (Aldrich Chemical Co.) and 13.21 g of ammonium phosphate, dibasic (EM Science) were ground and placed in an alumina crucible and heated to 500° C. in air for 16 hours. Once cooled, the materials were treated with a 25% $ZnCl_2$ solution (5 g/25–30 mL solution) for a period of 8–16 hours. The sample was filtered, washed with distilled water, and dried at 110° C. for 3–6 hours. The sample was tested via the spot method and exhibited color development.

EXAMPLE 25

Lithium Calcium Silicate, $Li_2Ca_6(SiO_4)_4$

In a mortar, 1.23 g of lithium carbonate (Aldrich Chemical Co.), 5.00 g of calcium carbonate (Aldrich Chemical Co.) and 2.00 g silica (Synthetic Amorphous Precipitated Silica (Sipernat-22), Degussa Corp.) were ground and placed in an alumina crucible and heated in air at 1100° C. for 12 hours. Once cooled, the materials were treated with a 10% $HNO_3$ solution (5 g/25–30 mL solution) for a period of 8–16 hours. The sample was filtered, washed with distilled water, and dried at 110° C. for 3–6 hours. The above sample was tested via the spot method and exhibited color development.

EXAMPLE 26
Lithium Zinc Boron Silicon Oxide

In the amounts shown in the table below, a lithium boron source (Alfa-Aesar), zinc oxide (Aldrich Chemical Co.) and silicic acid (Aldrich Chemical Co.) were ground in a mortar and placed in an alumina crucible and heated to 800° C. C in air for 16 hours. Once cooled, the materials were treated with a 10% $HNO_3$ solution (5 g/25–30 mL solution) for a period of 8–16 hours. The samples were filtered, washed with distilled water, and dried at 110° C. for 3–6 hours.

| | | | |
|---|---|---|---|
| 26A | 3.82 g $LiBO_2$ | 1.88 g ZnO | 4.20 g $H_2SiO_3$ |
| 26B | 3.52 g $LiBO_2$ | 3.13 g ZnO | 3.00 g $H_2SiO_3$ |
| 26C | 3.52 g $LiBO_2$ | 4.38 g ZnO | 1.80 g $H_2SiO_3$ |
| 26D | 3.82 g $Li_2B_4O_7$ | 1.88 g ZnO | 4.20 g $H_2SiO_3$ |
| 26E | 3.82 g $Li_2B_4O_7$ | 3.13 g ZnO | 3.00 g $H_2SiO_3$ |

The above samples were tested via the spot method and exhibited color development.

EXAMPLE 27
Lithium Zinc Boron Sulfur Silicon Oxide

In the amounts shown in the table below, anhydrous lithium sulfate (Alfa-Aesar), a lithium boron source (Alfa-Aesar), zinc oxide (Aldrich Chemical Co.) and silicic acid (Aldrich Chemical Co.) were ground in a mortar and placed in an alumina crucible and heated to 750° C. in air for 16 hours. Once cooled, the materials were treated with a 10% $HNO_3$ solution (5 g/25–30 mL solution) for a period of 8–16 hours. The samples were filtered, washed with distilled water, and dried at 110° C. for 3–6 hours.

| | | | | |
|---|---|---|---|---|
| 27A | 8.84 g $Li_2SO_4$ | 4.00 g $LiBO_2$ | 3.93 g ZnO | 8.79 g $H_2SiO_3$ |
| 27B | 8.84 g $Li_2SO_4$ | 4.00 g $LiBO_2$ | 6.54 g ZnO | 6.28 g $H_2SiO_3$ |
| 27C | 8.84 g $Li_2SO_4$ | 4.00 g $LiBO_2$ | 9.16 g ZnO | 3.77 g $H_2SiO_3$ |
| 27D | 4.42 g $Li_2SO_4$ | 6.80 g $Li_2B_4O_7$ | 1.97 g ZnO | 4.40 g $H_2SiO_3$ |
| 27E | 4.42 g $Li_2SO_4$ | 6.80 g $Li_2B_4O_7$ | 3.27 g ZnO | 3.14 g $H_2SiO_3$ |
| 27F | 4.42 g $Li_2SO_4$ | 6.80 g $Li_2B_4O_7$ | 4.58 g ZnO | 1.89 g $H_2SiO_3$ |

The above samples were tested via the spot method and exhibited color development.

EXAMPLE 28

Lithium Zinc Sulfur Phosphorus Silicon Oxide

In the amounts shown in the table below, anhydrous lithium sulfate (Alfa-Aesar), lithium phosphate tribasic (Aldrich Chemical Co.), zinc oxide (Aldrich Chemical Co.) and silicic acid (Aldrich Chemical Co.) were ground in a mortar and placed in an alumina crucible and heated to 800° C. in air for 16 hours. Once cooled, the materials were treated with a 5% $HNO_3$ solution (5 g/25–30 mL solution) for a period of 8–16 hours. The samples were filtered, washed with distilled water, and dried at 110° C. for 3–6 hours.

| | | | | |
|---|---|---|---|---|
| 28A | 7.61 g $Li_2SO_4$ | 0.89 g $Li_3PO_4$ | 4.38 g ZnO | 1.80 g $H_2SiO_3$ |
| 28B | 6.76 g $Li_2SO_4$ | 1.78 g $Li_3PO_4$ | 4.38 g ZnO | 1.80 g $H_2SiO_3$ |

The above samples were tested via the spot method and exhibited color development.

In the following examples, the inorganic oxide was treated with a Lewis acid rather than $HNO_3$.

EXAMPLE 29
Lithium Zinc Borosilicate $Li_4B_xZn_3Si_{z-m}O_{9-0.5x}$

Using a ratio of 1.31 moles of lithium zinc borosilicate to 1 mole of $AlCl_3*6\ H_2O$, about 480 grams of lithium zinc borosilicate were stirred in 3.5L of distilled water with a mechanical stirrer. While stirring, the aluminum chloride was added. The solution was stirred until it coagulated. The gel was allowed to sit for 1–2 hours before filtration. The majority of the water was filtered off, but not taken to dryness. The wet powder was dried in air at 80–100° C. until the powder was dry. The sample was tested via the spot method and exhibited color development.

EXAMPLE 30
Lithium Zinc Borosilicate $Li_4B_xZn_3Si_{z-m}O_{9-0.5x}$

The procedure of Example 29 was repeated using 1.68 moles $MgCl_2$ as the Lewis acid per mole of the borosilicate. The sample was tested via the spot method and exhibited color development.

EXAMPLE 31
Lithium Zinc Borosilicate $Li_4B_xZn_3Si_{z-m}O_{9-0.5x}$

The procedure of Example 29 was repeated using 1.22 moles $SnCl_4$ as the Lewis acid per mole of the borosilicate. The sample was tested via the spot method and exhibited color development.

EXAMPLE 32
Lithium Zinc Borosilicate $Li_4B_xZn_3Si_{z-m}O_{9-0.5x}$

The procedure of Example 29 was repeated using $ZnCl_2$ as the Lewis acid. The sample was tested via the spot method and exhibited color development.

EXAMPLE 33
Lithium Zinc Borosilicate $Li_4B_xZn_3Si_{z-m}O_{9-0.5x}$

The procedure of Example 29 was repeated using a mixture of $AlCl_3$ and $MgCl_2$ as the Lewis acid. The sample was tested via the spot method and exhibited color.

EXAMPLE 34
Lithium Zinc Borosilicate $Li_4B_xZn_3Si_{z-m}O_{9-0.5x}$

The procedure of Example 29 was repeated using a mixture of 0.65 moles $AlCl_3$ and 0.65 moles $SnCl_4$ as the Lewis acid per mole of the borosilicate. The sample was tested via the spot method and exhibited color.

EXAMPLE 35
Lithium Zinc Borosilicate $Li_4B_xZn_3Si_{z-m}O_{9-0.5x}$

The procedure of Example 29 was repeated using a mixture of 0.68 moles $AlCl_3$ and 0.68 moles $ZnCl_2$ as the

17

Lewis acid per mole of the borosilicate. The sample was tested via the spot method and exhibited color.

EXAMPLE 36

Sodium Zinc Silicate, $Na_xZn_y(SiO_4)_4$

In a mortar, 5.30 g (0.05 mol) of $Na_2CO_3$, 6.0 g (0.10 mol) of $SiO_2$ (SIP-22) and 12.21 g (0.15 mol) of zinc oxide were mixed with a minimal of water to make a paste. Once the paste was mixed thoroughly, it was placed in an alumina crucible and placed in an oven. The material was heated at 125° C. for 4 hours followed by a 16 hour treatment at 850° C. After cooling, the mixture was ground and treated with 1.3 moles aluminum chloride per mole of borosilicate. The sample was tested via the spot method and exhibited color.

EXAMPLE 37

Sodium Zinc Borosilicate, $Na_4B_3Bi_{z-x}O_{9-0.5x}$

In a mortar, 5.30 g (0.05 mol) of $Na_2CO_3$, 5.71 g (0.095 mol) of $SiO_2$ (SIP-22), 0.31 g (0.005 mol) of boric acid and 12.21 g (0.15 mol) of zinc oxide were mixed with a minimal of water to make a paste. Once the paste was mixed thoroughly, it was placed in an alumina crucible and placed in an oven. The material was heated at 125° C. for 4 hours followed by a 16 hour treatment at 850° C. After cooling, the mixture was ground and treated with 1.3 moles aluminum chloride per mole of borosilicate. The sample was tested via the spot method and exhibited color.

EXAMPLE 38

Potassium Zinc Borosilicate, $K_4B_xZn_3Si_{z-x}O_{9-05x}$

In a mortar, 10.00 g (0.072 mol) of $K_2CO_3$, 8.26 g (0.137 mol) of $SiO_2$ (SIP-22), 0.45 g (0.0073 mol) of boric acid and 17.66 g (0.217 mol) of zinc oxide were mixed with a minimal of water to make a paste. Once the paste was mixed thoroughly, it was placed in an alumina crucible and placed in an oven. The material was heated at 125° C. for 4 hours followed by a 16 hour treatment at 1050–1100° C. After cooling, the mixture was ground and treated with 1.3 moles aluminum chloride per mole of borosilicate. The sample was tested via the spot method and exhibited color.

Having described the invention in detail and by reference to preferred aspects thereof, it will be apparent that modifications and variations are possible without departing from the scope of the invention defined in the appended claims.

What is claimed is:

1. A method for producing a visible image comprising the steps of:
   selecting a developer selected from the group consisting of acid-treated, alkali metal-modified water insoluble inorganic oxides and acid-treated molecular sieves; and
   reacting said developer with an electron donor compound to produce an image.

2. The method of claim 1 wherein said developer is an inorganic oxide which exhibits the general formula:

$$L_w^{+a}M_y^{+b}(X_pO_n)_z^{-c}$$

where L is lithium, sodium, potassium or hydrogen; M is zinc, magnesium or calcium; X is silicon, boron, phosphorus, aluminum, sulfur, titanium or tin; O is oxygen; n is 3 to 25, p is 1 to 6; and each of w, y and z represents a numeral wherein w(a)+y(b)=z(c).

3. The method of claim 2 wherein X forms condensed oxides selected from the group consisting of $(Si_3O_9)^{-6}$, $(Si_4O_{12})^{-8}$, $(Si_8O_{24})^{-16}$, $(Si_2O_5)^{-2}$, $(Si_6O_{17})^{-4}$, $(B_2O_5)^{-4}$, $(B_3O_6)^{-3}$, $(P_2O_7)^{-4}$, $(P_3O_{10})^{-5}$, $(P_3O_9)^{-3}$, $(S_2O_6)^{-2}$.

4. The method of claim 2 wherein the acid for acid treating said acid-treated, alkali metal-modified water insoluble inorganic oxides and acid-treated molecular sieves is nitric acid or a Lewis acid selected from the group consisting of aluminum halides, zinc halides, transition metal halides, tin halides, boron halides, borates, sulfur trioxide, and mixtures thereof.

5. The method of claim 1 wherein the acid for acid treating said acid-treated, alkali metal-modified water insoluble inorganic oxides and acid-treated molecular sieves acid is selected from the group consisting of $AlCl_3$, $ZnCl_2$, $MgCl_2$, $SnCl_4$, or mixtures thereof.

6. The method of claim 1 wherein said developer is selected from the group consisting of lithium zinc silicate, lithium magnesium silicate, lithium aluminum zinc silicate, lithium zinc borosilicate, lithium titanium zinc silicate, lithium tin zinc silicate, lithium zinc silicon phosphate, lithium zinc silicon sulfate, calcium silicate, lithium zinc boron silicon oxide, lithium zinc boron sulfur silicon oxide, lithium zinc sulfur phosphorus silicon oxide, lithium zinc aluminate, lithium zinc borate, lithium tin borate, lithium zinc phosphate, lithium zinc sulfate, lithium hydrogen zinc phosphate, lithium hydrogen zinc boron phosphate, sodium zinc silicate, sodium zinc borosilicate, and potassium zinc borosilicate.

7. The method of claim 1 further comprising the steps of preparing a molecular sieve in a reaction which comprises reacting a molecular sieve precursor in the presence of a templating agent and treating said molecular sieve with an acid thereby creating said acid-treated molecular sieve developer.

8. The method of claim 7 wherein said molecular sieve precursor is a silicate, aluminosilicate or borosilicate.

9. The method of claim 7 wherein said molecular sieve is tetraethylorthosilicate, tetramethylammonium silicate or tetraethylammonium silicate.

10. The method of claim 7 wherein said templating agent is cetyltrimethyl-ammonium chloride/hydroxide in which about 30% of the chloride ions have been replaced with hydroxide ions.

11. The method of claim 7 wherein the acid for acid treating said acid-treated, alkali metal-modified water insoluble inorganic oxides and acid-treated molecular sieves is nitric acid or a Lewis acid selected from the group consisting of aluminum halides, zinc halides, transition metal halides, tin halides, boron halides, alkyl borates, sulfur trioxide, and mixtures thereof.

12. The method of claim 11 wherein said acid is $AlCl_3$, $ZnCl_2$, $MgCl_2$, $SnCl_4$, or mixtures thereof.

13. The method of claim 2 wherein said inorganic oxide is a lithium zinc silicate.

14. The method of claim 2 wherein said inorganic oxide is a lithium magnesium silicate.

15. The method of claim 2 wherein said inorganic oxide is a lithium aluminum zinc silicate.

16. The method of claim 2 wherein said inorganic oxide is a lithium zinc borosilicate.

17. The method of claim 2 wherein said inorganic oxide is a lithium titanium zinc silicate.

18. The method of claim 2 wherein said inorganic oxide is a lithium tin zinc silicate.

19. The method of claim 2 wherein said inorganic oxide is a lithium zinc silicon boron oxide.

20. The method of claim 2 wherein said inorganic oxide is a lithium zinc silicon phosphate.

21. The method of claim 2 wherein said inorganic oxide is a lithium zinc silicon sulfate.

22. The method of claim 2 wherein said inorganic oxide is a calcium silicate.

23. The method of claim 2 wherein said inorganic oxide is a lithium zinc boron silicon oxide.

24. The method of claim 2 wherein said inorganic oxide is a lithium zinc boron sulfur silicon oxide.

25. The method of claim 2 wherein said inorganic oxide is a lithium zinc sulfur phosphorus silicon oxide.

26. The method of claim 2 wherein said inorganic oxide is lithium zinc aluminate.

27. The method of claim 2 wherein said inorganic oxide is lithium zinc borate.

28. The method of claim 2 wherein said inorganic oxide is lithium tin borate.

29. The method of claim 2 wherein said inorganic oxide is lithium zinc phosphate.

30. The method of claim 2 wherein said inorganic oxide is lithium zinc sulfate.

31. The method of claim 2 wherein said inorganic oxide is lithium hydrogen zinc phosphate.

32. The method of claim 2 wherein said inorganic oxide is lithium hydrogen zinc boron phosphate.

33. The method of claim 2 wherein said inorganic oxide is sodium zinc silicate.

34. The method of claim 2 wherein said inorganic oxide is sodium zinc borosilicate.

35. The method of claim 2 wherein said inorganic oxide is potassium zinc borosilicate.

* * * * *